United States Patent [19]
Rist

[11] 3,892,302
[45] July 1, 1975

[54] VEHICLE DISC CLUTCH WITH PLURAL RELEASE LEVERS

[75] Inventor: Michel Rist, Boulogne, France

[73] Assignee: Societe Anonyme Francaise du Ferodo, Paris, France

[22] Filed: Jan. 22, 1974

[21] Appl. No.: 435,581

[30] Foreign Application Priority Data
Feb. 2, 1973 France............................ 73.03677

[52] U.S. Cl............... 192/91 A; 192/70; 192/70.3; 192/91 R; 192/93 R; 192/99 A
[51] Int. Cl........................................... F16d 25/04
[58] Field of Search ..... 192/48.1, 48.7, 48.8, 70.29, 192/70.3, 70, 85 CA, 91 A, 99 A

[56] References Cited
UNITED STATES PATENTS

| | | | |
|---|---|---|---|
| 2,261,432 | 11/1941 | Cooke................................ | 192/48.8 |
| 2,386,540 | 10/1945 | Campodonico................. | 192/48.8 X |
| 3,215,233 | 11/1965 | Smith et al..................... | 192/99 A X |
| 3,696,900 | 10/1972 | Montalvo........................ | 192/70 |
| 3,760,918 | 9/1973 | Wetrich et al................ | 192/85 CA |
| 3,774,460 | 11/1973 | Browning et al............... | 192/48.7 |

*Primary Examiner*—Benjamin W. Wyche
*Attorney, Agent, or Firm*—Young & Thompson

[57] ABSTRACT

In a clutch having two clutch assemblies disposed axially one behind the other controlled respectively by two clutch release levers, the control means for the clutch release levers comprise two operative elements mounted for axial movement in opposite directions, one of the elements being adapted to apply a thrust to one clutch release lever and the other of the elements being adapted to apply a traction to the other clutch release lever, operating means being interposed between the said elements to simultaneously move the elements in opposite directions.

17 Claims, 11 Drawing Figures

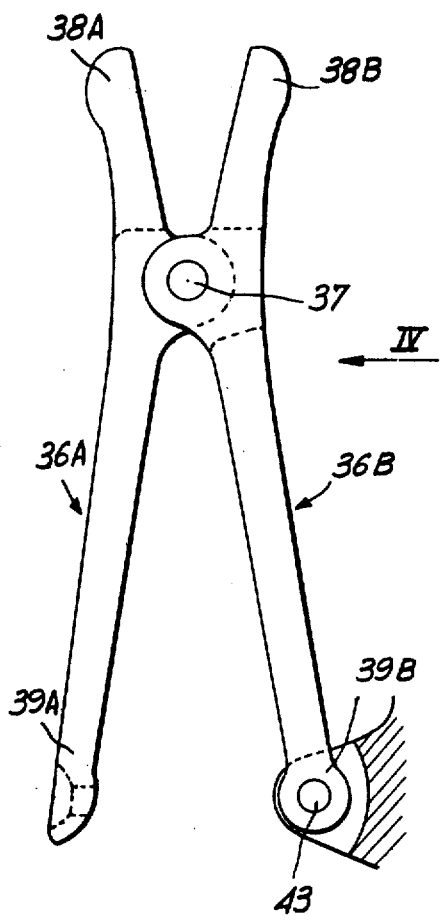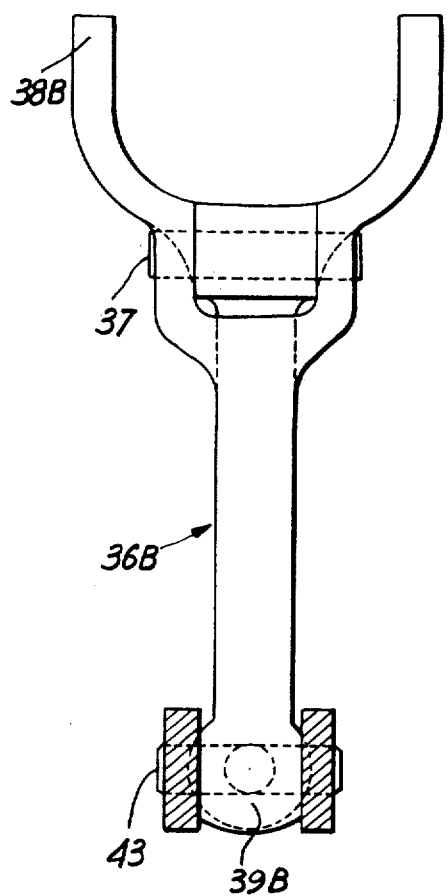

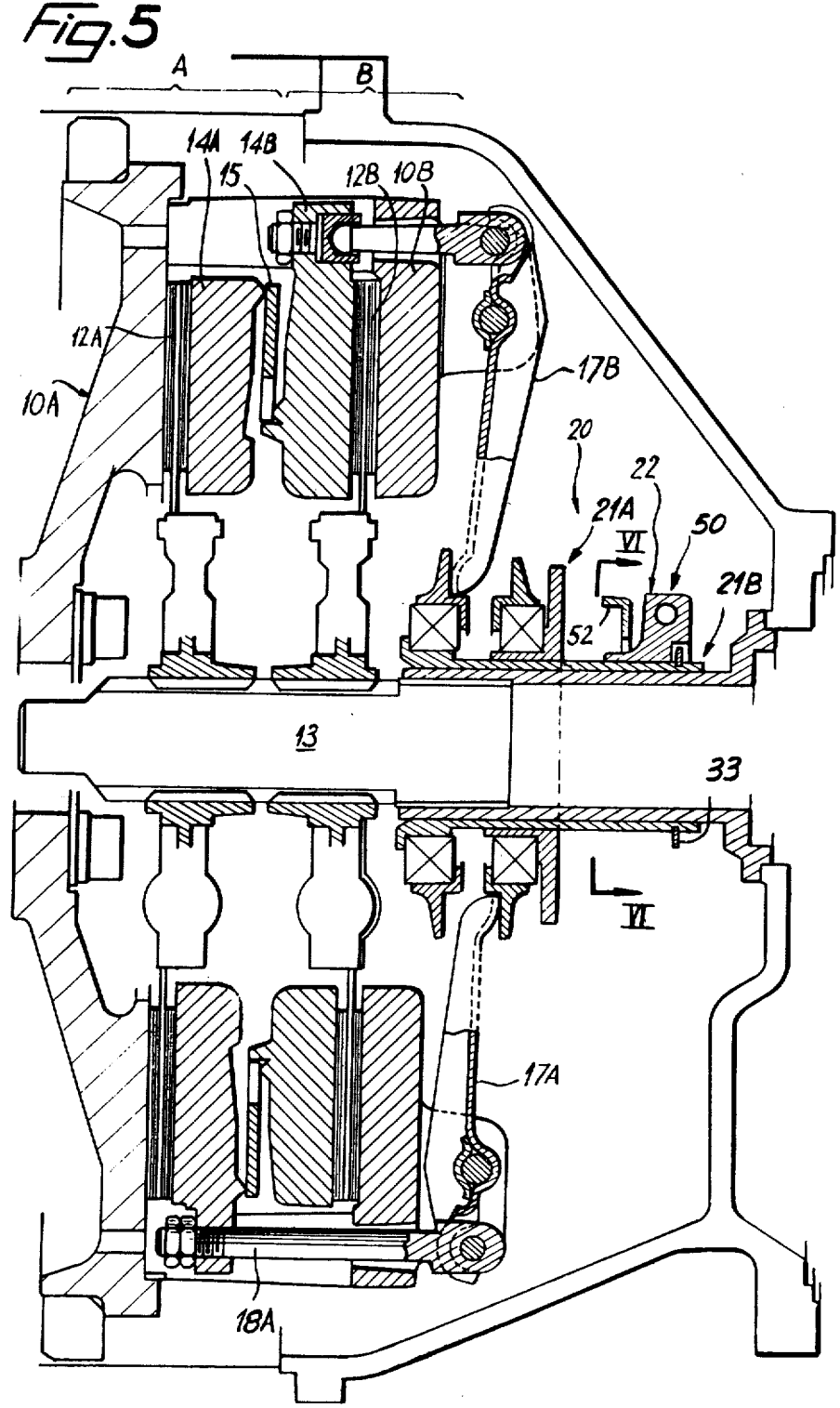

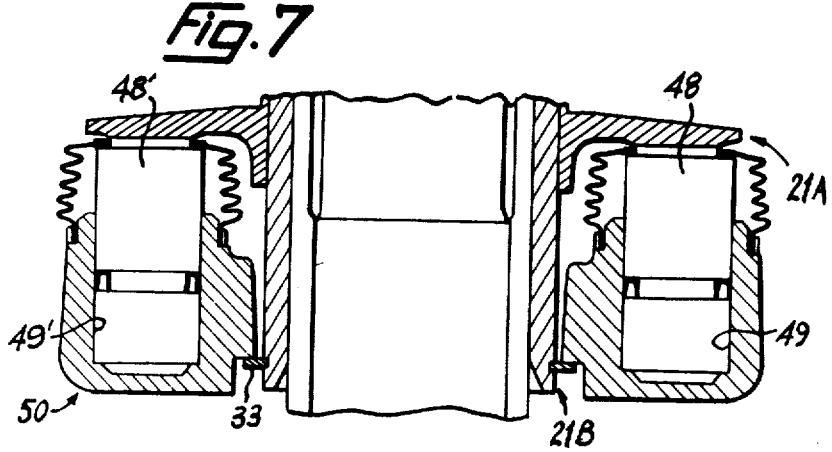
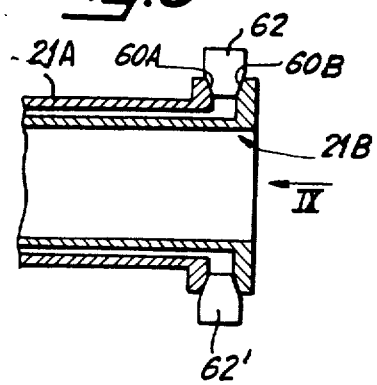
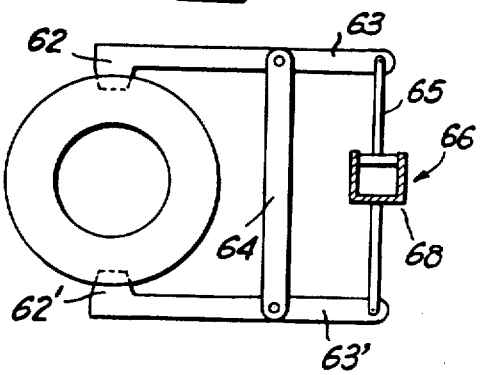
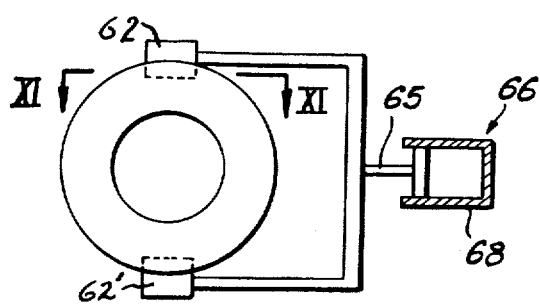
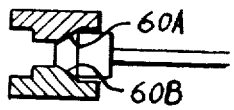

VEHICLE DISC CLUTCH WITH PLURAL RELEASE LEVERS

BACKGROUND OF THE INVENTION

1. Field of the Invention

The present invention relates generally to clutches, particularly clutches for motor vehicles, and more especially concerns those clutches which comprise two clutch assemblies disposed axially one behind the other, each of the said clutch assemblies being composed of a reaction plate intended to be rotationally fastened on a first shaft, generally a driving shaft, a friction disc movable axially in relation to the reaction plate and intended to be rotationally fastened on the second shaft, generally a driven shaft, a pressure plate movable axially in relation to the reaction plate and rotationally fastened on the latter, elastic means which urge the pressure plate in the direction of the reaction plate in order to clamp the friction disc, at least one pivotally mounted clutch release lever, and control means adapted to control the pivoting of the clutch release lever or levers of each clutch assembly, in order to release the corresponding friction discs.

2. Description of the Prior Art

In known clutches of this kind, there are either two separate sets of clutch release levers, each respectively associated with one of the clutch assemblies, or a single set of clutch release levers common to the two clutch assemblies, but in all cases these clutch assemblies are in practice operated independently of one another, in relation to a fixed element which is generally the casing of the assembly.

This has the result that the actions of clamping and releasing the friction discs of the two clutch assemblies are not consistently effected in a strictly balanced manner.

In the case of friction discs fastened on the same driven shaft, a time difference between their respective clampings and/or poor distribution of the loads between these discs will inevitably entail rapid, dissymmetrical wear of the linings carried by the friction discs, which will be prejudicial to the life of the whole assembly.

In order to obviate these disadvantages it has been proposed to effect what is usually called equalising, that is to say equal distribution of the loads of the friction discs, by providing a common plate between the two friction discs, in which case the clutch has three plates instead of four.

As the friction discs are axially aligned on each side of this common plate, it is not possible to pass a torque through one of these friction discs without passing the same torque through the other disc, so that the desired equalisation condition is obtained.

Nevertheless, the provision of a single common plate between two friction discs entails the disadvantage that this plate is heated on both its faces without it being possible for the faces to be effectively ventilated; in addition the plate may remain wedged when declutching is effected, in which case one of the friction discs remains at least partly clamped.

The thermal capacity of such clutches is therefore limited and they are in addition subject to operational difficulties.

The main object of the present invention is to provide a clutch assembly in which the advantages of equalisation are combined with the correct ventilation of the plates in question.

SUMMARY

According to the invention, a clutch of the kind described above, that is to say a clutch comprising two clutch assemblies each of which has two plates, one being a reaction plate and the other a pressure plate, is characterised in that the control means comprise two operative elements mounted for movement parallel to the axis of the clutch, one being adapted to act on the clutch release lever or levers of a first clutch assembly, in a first axial direction, for example the thrust direction, and the other being adapted to act on the clutch release lever or levers of the second clutch assembly in a second axial direction, for example the traction direction, which is opposite to the previous direction, and operating means adapted to control the simultaneous operation, in opposite directions, of the said operative elements.

In a first embodiment, said operating means comprise two levers which in a median position are articulated to one another and of which one end bears against one of the operative elements; in the case of one of the said levers the other end is subjected to the action of actuating means, such as a hydraulic jack, while in the case of the other of these levers, the corresponding end is articulated at a fixed point.

According to a second embodiment the operating means are actuated hydraulically and comprise a piston movable parallel to the axis of the clutch and bearing against one of the operative elements; this piston is engaged in a blind cylinder formed in a casing, and this casing bears against the other operative element. As an alternative, the said piston is engaged in a cylinder open at both ends and formed in a casing, and with it is associated a second piston which is mounted for movement in the said cylinder in a direction opposite to the first piston and which bears against the other operative element.

According to a third embodiment the operating means comprise two lips, each of which is formed respectively on the operative elements and which diverge in relation to one another in co-operation with at least one wedge disposed between these lips and mounted for movement in such a manner as to be able to drive them apart; it is preferable to provide two wedges acting in diametrically opposite positions.

However this may be, these operating means provide at the control level an equalisation of the loads applied to the friction discs, that is to say an equal distribution of these loads between these friction discs, and each of these friction discs is gripped individually between a reaction plate and a pressure plate, so that each of these plates has at least one of its faces free of all friction and therefore capable of being effectively ventilated, so as to provide acceptable cooling of the plate in question.

Furthermore, the arrangement according to the invention simultaneously provides a pushing action and a traction action for the operation of the two clutch assemblies, so that these two actions are balanced by each other in a direction parallel to the axis of the clutch, and there is consequently no undesirable thrust in one direction or the other on either the drive shaft or the driven shaft of the clutch.

Finally, the arrangement according to the invention makes it possible to use identical clutch release levers 3,892,302 for both the clutch assemblies, thus advantageously reducing the cost of manufacture and storage and simplifying assembly.

BRIEF DESCRIPTION OF THE DRAWINGS

FIG. 3 is a view in elevation of the operating levers used in this clutch;

FIg. 4 is a side view of these operating levers in the direction of the arrow IV in FIG. 3;

FIG. 5 is a similar view to FIG. 2 and relates to a modified embodiment;

FIG. 7 is a partial axial sectional view of this modified embodiment, taken along the line VII—VII in FIG. 6;

FIG. 8 is a partial axial sectional view illustrating another alternative form of construction of the operating means capable of being used in a clutch according to the invention;

FIG. 9 is a side view of these operating means in the direction of the arrow IX in FIG. 8;

FIG. 10 is a similar view to FIG. 9 and relates to a modified embodiment; and

FIG. 11 is a partial sectional view of this modified embodiment, taken on the line XI—XI in FIG. 10.

DESCRIPTION OF THE PREFERRED EMBODIMENTS

Figure 1:
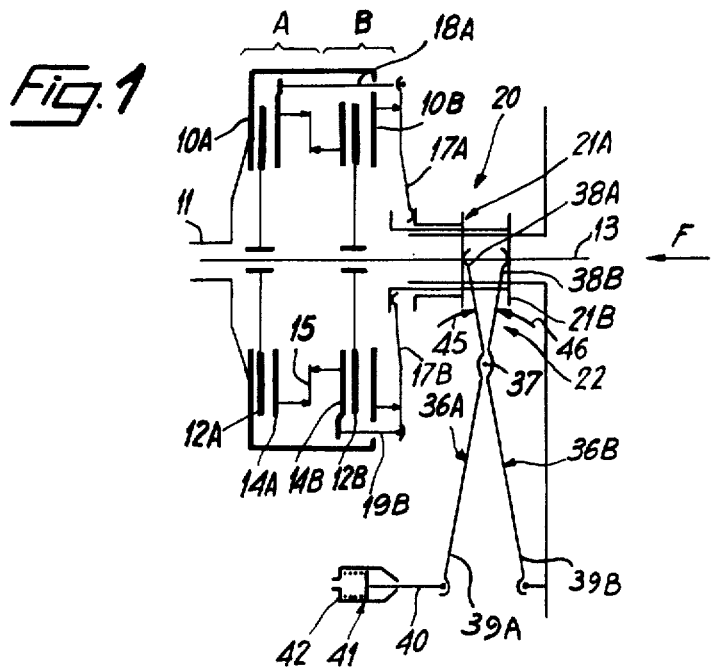
FIG. 1 is a view in diagrammatical section illustrating the general structure of a clutch according to the invention.
Figure 2:
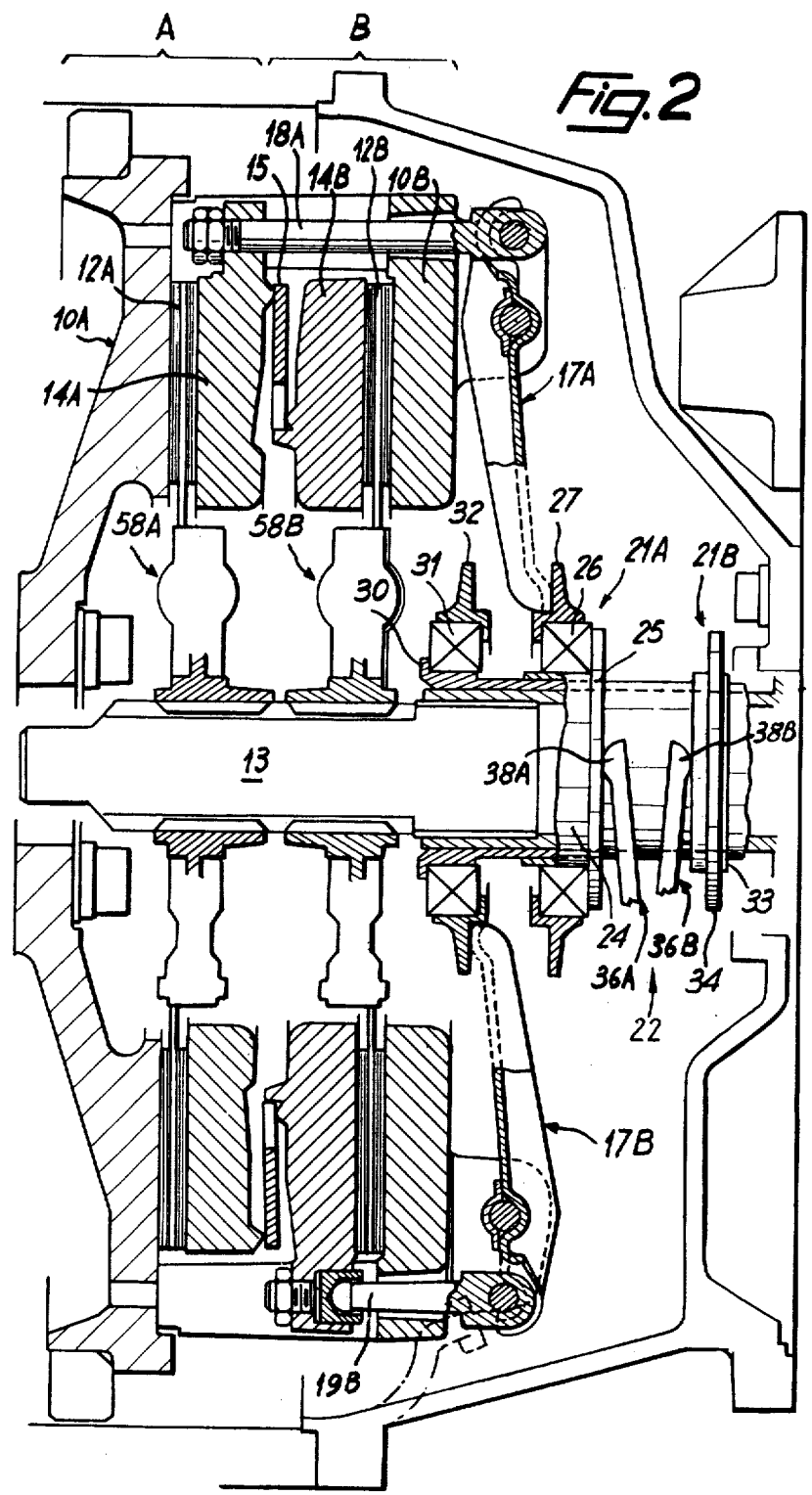
FIG. 2 is a view in axial section of one form of construction of this clutch.

A clutch having a single output is shown in FIGS. 1 and 2.

A clutch of this kind comprises in succession two clutch assemblies A and B disposed axially one behind the other.

The clutch assembly A comprises a reaction plate 10A forming a flywheel and intended to be rotationally fastened to a first shaft 11, generally a drive shaft, a friction disc 12A movable axially in relation to the reaction plate 10A and rotationally fastened on a shaft 13, generally a driven shaft, and a pressure plate 14A movable axially in relation to the reaction plate 10A and rotationally fastened on the latter.

Similarly, the clutch assembly B comprises a reaction disc 10B fastened to the reaction plate 10A, a friction disc 12B which is fastened on the driven shaft 13, and a pressure plate 14B which is movable axially in relation to the reaction plate 10B and which is rotationally fastened on the latter.

For the necessary rotational connections, substantially tangential tongues extend between the pressure plate 14A and the reaction plate 10A on the one hand, and between the pressure plates 14B and the reaction plate 10B on the other hand; the reaction plate 10B is for the same purpose fastened to the reaction plate 10A.

These arrangements are well known per se and will not be described in detail below.

In the example illustrated, the reaction plates 10A, 10B enclose the pressure plates 14A, 14B and between the latter is disposed an elastic washer 15 of the Belleville washer type, forming elastic means which are common to the pressure plates 14A and 14B and which urge these pressure plates in the direction of the corresponding reaction plates 10A, 10B, in order to clamp the friction discs 12A, 12B.

With the clutch assembly A is associated a set of clutch release levers 17A mounted for pivoting on the reaction plate 10B and attached by tie-rods 18A to the pressure plate 14A.

Similarly, with the clutch assembly B there is associated a set of clutch release levers 17B mounted for pivoting on the reaction plate 10B and adapted to act on the pressure plate 14B through push-rods 19B.

The clutch release levers 17A, 17B extend substantially radially in the direction of the axis of the clutch, and close to the axis there are associated with them control means 20, which by acting on the free ends of the clutch release levers are adapted to effect the pivoting thereof and thus to effect the release of the corresponding friction discs 12A and 12B.

These arrangements are likewise well known per se and will not be described in detail below.

According to the invention the control means 20 comprise two operative elements 21A, 21B mounted for movement parallel to the axis of the clutch, the first being adapted to act on the clutch release lever 17A in a first axial direction, known as the thrust direction and indicated by an arrow F in FIG. 1, while the second is adapted to act on the clutch release lever 17B in a second axial direction known as the traction direction and opposite to the thrust direction, and operating means 22 interposed between the operative elements 21A and 21B and adapted to effect the simultaneous operation of these elements in opposite directions.

According to the embodiment illustrated in FIGS. 1 and 2 the operative element 21A is a thrust ring engaged and axially movable on a traction sleeve, which in turn is mounted for axial movement and constitutes the operative element 21B.

In the example illustrated the thrust ring 21A comprises a ring 24 mounted for sliding on the sleeve 21B and carrying radially an annular flange 25 adapted to act on the associated operating means 22, a ball bearing 26, and a cap 27 attached to the latter for the purpose of acting on the clutch release levers 17A.

Furthermore, the traction sleeve 21B is provided with a radial projection at each of its ends. In the example illustrated, one of these radial projections is formed by an annular collar 30 against which abuts a bearing 31 carrying a cap 32 for acting on the clutch release levers 17B, and the other of these radial projections is a circlip 33 against which abuts a flange 34 for acting on the associated operating means 22.

In the embodiment illustrated in FIGS. 1 to 4 these operating means 22 comprise two levers 36A, 36B which in an intermediate position are articulated to one another by a pivot 37.

The end of each of the levers 36A, 36B which bears against an operative element forms a fork 38A, 38B; the other end 39A of the lever 36A is subjected to the action of the piston 40 of a hydraulic jack 41 whose body 42 is fixed, and the corresponding end 39B of the lever 36B is articulated about a fixed pivot 43.

In the example illustrated the levers 36A, 36B thus form inverted scissors, that is to say for the purpose of moving the ends 38A, 38B away from one another it is necessary for their ends 39A, 39B to be moved towards one another.

Clearly, these levers 36A, 36B can be articulated as scissors, and the hydraulic jack 41 or any other similar actuating means may have its piston 40 connected to the end 39A of the lever 36A, its body 42 being attached to the end 39B of the lever 36B.

In normal operation the elastic washer 15 urges the pressure plates 14A, 14B in the direction of the reaction plates 10A, 10B; the friction discs 12, 12B are clamped and the clutch is therefore in the engaged position.

If fluid under pressure is supplied to the jack 41, the lever 36A will pivot in the direction of the arrow 45 in FIG. 1, and at the same time the thrust action of this jack will be transmitted by the lever 36A to the pivot 37, which is common to the said lever and to the lever 36B, so that the said lever 36B will pivot in the direction of the arrow 46, i.e., in an opposite direction to arrow 45.

Consequently, through its end 38A the lever 36A applies a thrust action to the thrust ring 21A in the direction of the arrow F in FIG. 1, and this thrust action is transmitted by this thrust ring to the clutch release lever 17A; the friction disc 12A is thus released.

Simultaneously, the lever 36B applies through its end 38B a traction action to the traction sleeve 21B in the reverse direction to that indicated by the arrow F, and this traction action is transmitted by this sleeve to the clutch release lever 17B; the friction disc 12B is released.

The clutch is then in the disengaged position.

If the pressure of fluid delivered into the jack 41 is relaxed, the elastic washer 15 will again effect the clamping of the friction discs 12A, 12B.

Figure 6:
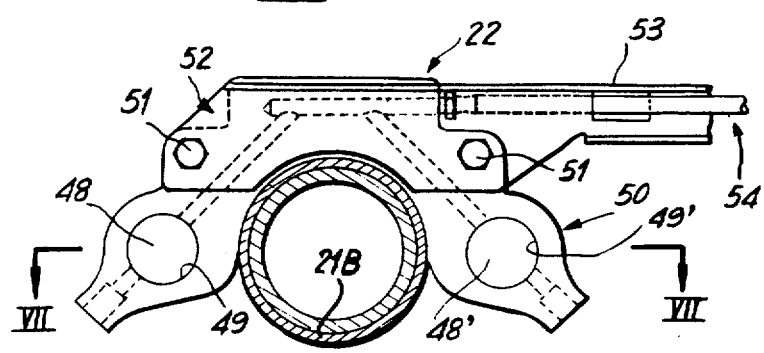
FIG. 6 is a partial cross-sectional view of this alternative embodiment, taken along the line VI—VI in FIG. 5.

In the modified embodiment illustrated in FIGS. 5 to 7, the operating means 32 associated with the operative elements 21A, 21B are hydraulically actuated and comprise at least one piston mounted for axial movement parallel to the axis of the clutch, this piston bearing against either of the said operative elements.

In this embodiment, the operating means 22 comprise two pistons 48, 48', each of which is engaged in a blind cylinder 49, 49' formed in a common casing 50; these pistons 48, 48', which are movable parallel to one another, both bear against the thrust ring constituting the operative element 21A, while the casing 50 abuts the circlip 33 provided at the end of the traction sleeve constituting the operative element 21B.

In the example illustrated, the casing 50 is stirrup-shaped with two arms, and is simply engaged on the sleeve 21B transversely to the latter.

This stirrup 50 is attached by bolts 51 to a plate 52 which laterally has a gutter-shaped extension 53.

This extension is adapted to serve as means of gripping and positioning the casing 50, and is also adapted to protect a pipe 54 for supplying fluid under pressure to the cylinders 49, 49'.

In the example illustrated the line of action of the piston 48, 48' is coplanar with the axis of the clutch, perpendicularly to an axial plane of symmetry passing through the median zone of the stirrup 50.

When fluid under pressure is supplied to the cylinders 49, 49' the pistons 48, 48' apply a thrust action to the thrust ring 21A, which, as previously, is transmitted to the clutch release lever 17A, and simultaneously the casing 50 applies through the circlip 33 a traction action to the traction sleeve 21B, and, as previously, this is transmitted to the clutch release lever 17B.

It is clear that the pistons 48, 48' could act on the traction sleeve 21B, the casing 50 simultaneously acting on the thrust ring 21A.

It is likewise clear that the cylinders 49, 49' could be open at both ends, a second set of pistons being associated with the first, and the sets of pistons provided acting respectively on the operative elements 21A, 21B.

In the example illustrated in FIGS. 1 to 6 the friction discs 12A, 12B are fastened on the driven shaft 13 by means of torsion damping devices 58A, 58B.

FIGS. 8 to 11 relate to alternative constructions of the operating means 22, according to which two divergent lips 60A, 60B are formed respectively opposite one another on the operative elements 21A, 21B.

In the embodiment illustrated in FIGS. 8 and 9 these lips 60A, 60B diverge in relation to one another in the direction away from the axis of the clutch, and two wedges 62, 62' are associated with them, these wedges being disposed in diametrically opposite positions and each of them being inserted between the said lips.

These wedges 62, 62' are carried by levers 63, 63' which in an intermediate position are articulated on a common cross-member 64.

To one of the levers 63, 63' is attached the piston 65 of a jack, whose body 68 is connected to the corresponding end of the other of these levers.

When fluid under pressure is supplied to this jack 66, the wedges 62, 62' move towards one another in a direction substantially perpendicular to the axis of the clutch, and this results in the moving of the operative element 21A, 21B, away from one another.

In the variant illustrated in FIGS. 10 and 11, the lips 60A and 60B diverge in relation to one another in a direction substantially parallel to the axis of the clutch, and the associated wedges 62, 62' are both carried by the piston 65 of the jack 66, this piston being movable in a direction substantially perpendicular to the axis of the clutch, transversely in relation to the latter.

It will be apparent that in either case a single wedge is sufficient.

The present invention is of course not limited to the embodiments described and illustrated, but covers any alternative construction and/or combination of their various elements.

In particular, in the case of hydraulic operation or more generally operation by a fluid, the number and/or arrangement of the pistons contained in an operating system of this kind may be different from those more particularly described.

For example, the axis of displacement of the pistons may be situated in a plane located beyond the axial plane which is perpendicular to the axial plane of symmetry passing through the median zone of the stirrup-shaped casing, and/or a third piston may be provided in this zone.

Furthermore, although the invention is more particularly intended for application to the case where the friction discs 12A, 12B are fastened on the same driven shaft, it is likewise applicable to the case where the friction discs is fastened to separate driven shafts, the two driven shafts being driven simultaneously in this case.

In addition, in the examples illustrated the ball bearings 26 and 31 used - one in the thrust ring 21A and the other at the end of the traction sleeve 21B - are of substantially the same diameter, and the clutch release levers 17A and 17B are identical.

In order to save space axially, bearings of different diameters may be used, disposed coaxially one around the other, the thrust ring and/or a traction sleeve 21B having for this purpose a stepped arrangement; in this case the clutch release levers 17A, 17B would not be identical.

Moreover, instead of acting to move the operative elements 21A and 21B apart, the operating means 22 could have the action of bringing them towards one another; in this case the operative element 21B pulls on the clutch release lever 17A, and the operative element 21B pushes on the clutch release levers 17B.

Finally, it will be appreciated that in all cases each of the plates 10A, 10B, 14A, 14B has a face capable of being satisfactorily ventilated.

I claim:

1. A clutch comprising two coaxial clutch assemblies each of the said clutch assemblies including a reaction plate adapted to be fastened for rotation with a first shaft, a friction disc movable axially with respect to the reaction plate and adapted to be fastened for rotation with a second shaft, a driven shaft to which both friction discs are fixed, a pressure plate movable axially with respect to the reaction plate and fastened for rotation thereto, resilient means urging the pressure plate toward the reaction plate in order to grip the friction discs, and at least one pivotally mounted clutch release lever, in combination with control means adapted to effect the pivoting of said at least one clutch release lever of each clutch assembly, in order to release the corresponding friction discs, said control means including two operative elements mounted for movement parallel to the axis of the clutch, one said operative element acting on said at least one clutch release lever of a first one of said clutch assemblies axially in a first direction, and the other said operative element acting on said at least one clutch release lever of a second one of said clutch assemblies axially in a second direction opposite to said first direction, and operating means to effect the simultaneous operation of said two operative elements in opposite directions.

2. A clutch according to claim 1, wherein the pressure plates are disposed between the reaction plates and resilient means common to the two pressure plates are disposed between the pressure plates.

3. A clutch according to claim 1, wherein each of said two operative elements comprises a thrust ring engaging for axial movement a traction sleeve also mounted for axial movement, said traction sleeve having at each of its ends a radial projection, one of the projections cooperating with said at least one clutch release lever of the second clutch assembly and the other of the projections cooperating with the associated said operating means which, in order to act on said at least one clutch release lever of the first clutch assembly, also bears against said thrust ring.

4. A clutch according to claim 3, wherein the thrust ring has bearing means.

5. A clutch according to claim 3, and bearing means between said at least one clutch release lever of the second clutch assembly and the corresponding radial projection on the traction sleeve.

6. A clutch according to claim 1, wherein the operating means comprise two levers which in a median position are pivotally connected to each other and in which one end of each lever bears against one of said operative elements.

7. A clutch according to claim 6, wherein said one end of said levers which bear against said operative elements is formed as a fork.

8. A clutch according to claim 7, wherein the other end of one of said levers is subjected to the action of hydraulic actuating means, and the other end of the other of said levers is pivoted about a fixed point.

9. A clutch according to claim 8, wherein said levers are pivotally connected to each other remote from their ends.

10. A clutch according to claim 1, wherein said operating means are hydraulically operated and comprise at least one piston movable parallel to the axis of the clutch, said piston bearing against one of said operative elements.

11. A clutch according to claim 10, wherein said piston is located in a blind cylinder formed in a casing that bears against the other of said operative elements.

12. A clutch according to claim 10, wherein said piston is located in a cylinder formed in a casing and is open at both ends, and there is a second piston associated therewith and mounted for movement in the said cylinder in a direction opposite to the first piston and bearing against the other of said operative elements.

13. A clutch according to claim 10, wherein the piston is located in a cylinder formed in a stirrup-shaped casing having two arms engaging transversely the support sleeve.

14. A clutch according to claim 1, wherein the operating means comprise two lips, each of which is formed respectively on one of the operative elements and diverge from each other, the lips cooperating with at least one wedge disposed therebetween, which wedge moves between the lips to drive the lips apart.

15. A clutch according to claim 14, wherein said lips diverge from each other away from the axis of the clutch, and each wedge is mounted for movement in a direction substantially perpendicular to said axis.

16. A clutch according to claim 14, wherein said lips diverge from each other in a direction parallel to the axis of the clutch, and each wedge is mounted for movement in a direction substantially parallel to said axis.

17. A clutch according to claim 14, wherein two wedges are provided acting in diametrically opposite positions.

* * * * *